United States Patent
Farenholtz

(12)
(10) Patent No.: US 6,478,500 B1
(45) Date of Patent: Nov. 12, 2002

(54) HYPEREXTENDING JOINT

(75) Inventor: Douglas William Farenholtz, Abbotsford (CA)

(73) Assignees: PTM Equipment Inc. (CA); Medical Plastics Laboratory, Inc., Gatesville, TX (US)

( * ) Notice: Subject to any disclaimer, the term of this patent is extended or adjusted under 35 U.S.C. 154(b) by 0 days.

(21) Appl. No.: 09/531,593

(22) Filed: Mar. 20, 2000

(51) Int. Cl.$^7$ ................................................. F16C 11/00
(52) U.S. Cl. ........................ 403/84; 403/119; 403/145; 403/59; 223/66; 434/396; 623/59
(58) Field of Search .......................... 223/66; 434/396; 403/119, 145, 84, 148, 147, 146, 154, 150, 59, 83, 85; 16/430, 900; 623/59, 39, 45

(56) References Cited

U.S. PATENT DOCUMENTS

| | | | |
|---|---|---|---|
| 526,667 A | | 7/1894 | Schultz |
| 817,511 A | | 4/1906 | Palmenberg |
| 2,575,802 A | * | 11/1951 | Fischer et al. .............. 403/145 |
| 2,617,671 A | | 11/1952 | Barrango |
| 2,934,858 A | * | 5/1960 | Weih .......................... 403/107 |
| 3,357,610 A | | 12/1967 | Quinby |
| 3,581,808 A | * | 6/1971 | Vertesi et al. ............... 403/145 |
| 4,545,514 A | | 10/1985 | Toy |
| 4,630,762 A | | 12/1986 | Stringer |
| 4,821,707 A | * | 4/1989 | Audette ........................ 623/39 |
| 5,180,086 A | * | 1/1993 | Ikeda ........................... 223/66 |
| 5,630,745 A | | 5/1997 | Yeh |
| 6,189,420 B1 | * | 2/2001 | Shiao ........................... 403/84 |
| 6,216,317 B1 | * | 4/2001 | Chen ............................ 403/84 |

FOREIGN PATENT DOCUMENTS

| | | | | |
|---|---|---|---|---|
| GB | 1032942 A | | 6/1966 | ................... 403/84 |
| GB | 0430846 A | | 6/1991 | ................... 403/93 |

* cited by examiner

*Primary Examiner*—Lynne H. Browne
*Assistant Examiner*—Aaron M Dunwoody
(74) *Attorney, Agent, or Firm*—Merek & Voorhees

(57) ABSTRACT

A joint for rotatably connecting a distal part to a proximal part of a testing and training target the joint including a first member attachable to one of the distal part and the proximal part of the target, a second member attachable to the other of the distal part and the proximal part of the target with the first and second members being rotatable relative to each other and engageable with each other such that the first member may be rotated with respect to the second member between first and second positions and upon the application of a predetermined force rotated past the second position to a third position. A detent communicates with one or both of the first and second members preventing movement of the members past the second position to the third position until at least the first predetermined force is applied to one or both of the members.

53 Claims, 12 Drawing Sheets

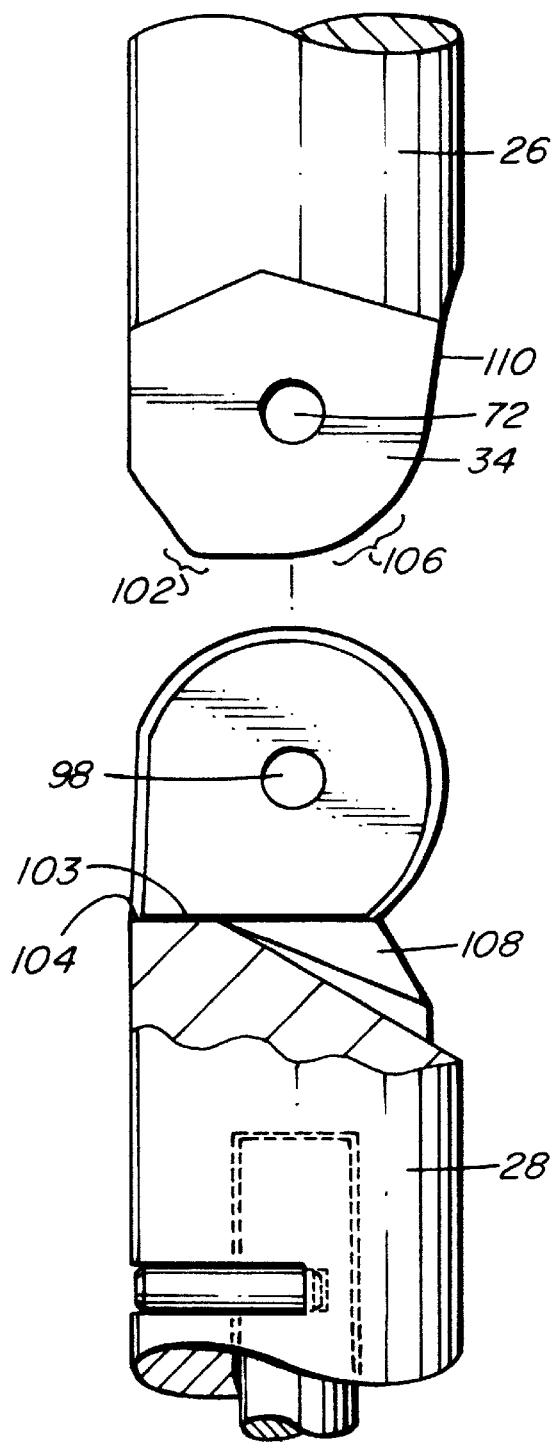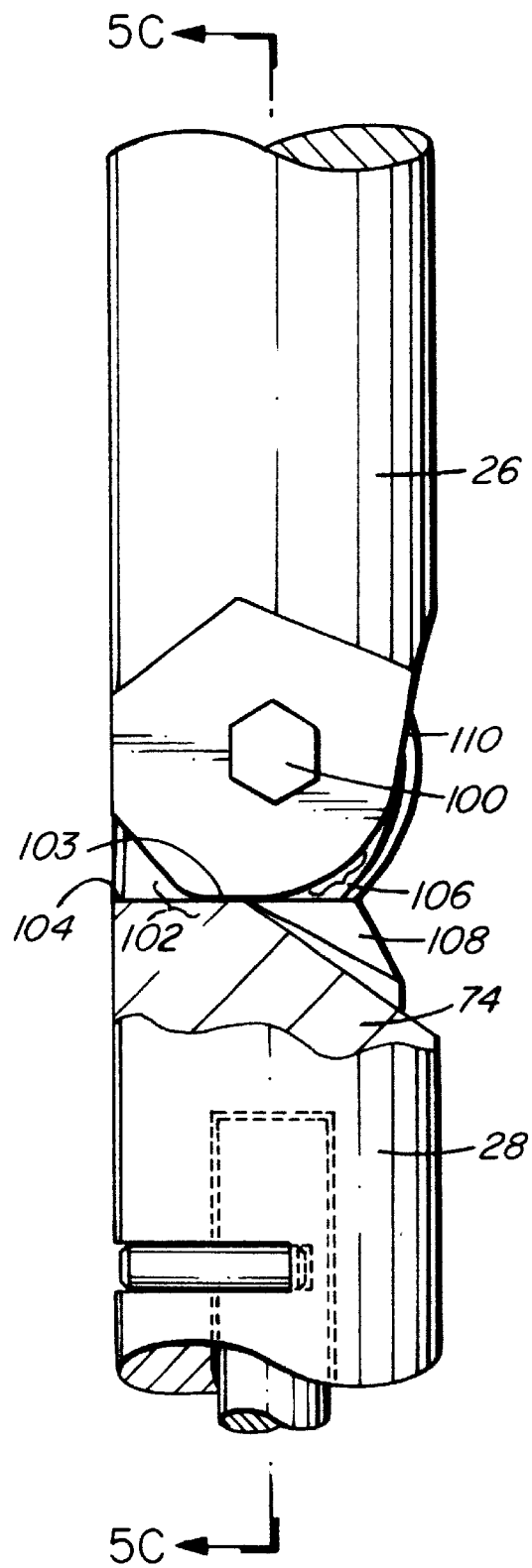
FIG. 5A
FIG. 5B

HYPEREXTENDING JOINT

BACKGROUND OF THE INVENTION

This invention is directed to a joint capable of rotational movement between two positions and further rotatable to a third position upon application of a predetermined force. The invention is more particularly directed to a joint which emulates the movement of the elbow or knee joints from a normal position to a hyperextended position.

Human form mannequins having articulating limbs are useful in training police officers and security personnel, as well as martial arts sport participants. Individuals use these mannequins to train themselves by making various restraining moves against the mannequin as the target which acts as a substitute for a live human target. This is generally undertaken by manipulating the limbs of the mannequin in certain specific manners as a part of a training procedure to teach proper methods for restraining an individual such as a criminal suspect or martial arts opponent.

It is important in developing useful training mannequins of this type to ensure that the articulating limbs demonstrate closely the normal functional flexion, extension and rotational positions of those limbs. Many suspect control tactics employed by law enforcement and security officers and many martial arts training programmes utilize a target's limbs (arms and legs) as third class levers. For example the law enforcement officer or martial arts trainee could push down on the elbow joint of the target while pulling upwards on the wrist while maintaining shoulder stability. The bending and twisting of the arm and lower leg to the extreme is not a normal function of the body, but is often used by police, security personnel and martial arts practitioners in applying painful control tactics to a resisting suspect or opponent. It is important in most situations to control the level of force applied on the target individual to prevent serious injury to that individual while maintaining adequate control over that individual.

The level of appropriate force can often be difficult to control, particularly in trainees who are learning suspect control tactics or martial arts moves as these individuals do not generally have an understanding of the physical limitations of the target's limbs in applying these forces. This can result in harm to the target through movement of the limb joint past a position which is adequate for control to a hyperextended position which causes physical damage to the target individual, including the breaking of limbs, the dislocation of the joint or stretching or tearing of ligaments in the joint. In most cases this is an undesirable consequence of target restraint tactics in a law enforcement environment and an undesirable consequence in a martial arts environment.

It is also important to appreciate that the application of force under a martial arts, and the restraining and controlling of suspects in a law enforcement and security context, varies widely with the size, strength and awareness of the target individual as well as the environment in which the force is being applied. For example, a large male individual will usually provide greater resistance to movement of a limb into a controlling position than a small female or child. The force application requirement will also vary depending on whether or not the target is alert to the possibility of a controlling tactic being applied to that individual. Taken by surprise, a target may be manipulated into a controlled position by a law enforcement or security officer with minimal force, as compared to a target who is actively resisting control.

There is consequently a need for a mannequin having articulated limbs which may be used as a target in the practise of suspect control tactics and martial arts sport and training programmes which provides realistic resistance to manipulation of the limb about the joint from any flexion or extension position to a hyperextended position used to control the target or to undertake a martial arts move, without applying excessive force which would result in serious damage to the target's limbs or joints.

There is also a need for a mannequin having articulate limbs which are adjustable to vary the force necessary to move the limb about the joints to the hyperextended position to provide a range of training options depending on the individual characteristics of a potential suspect or martial arts opponent to be emulated by the mannequin.

This will enable enforcement and security personnel as well as martial artists to develop better knowledge through practice and training as to the amount of force reasonably required to restrain an individual using a control tactic or martial arts move, without applying excessive force to damage the limb or its joint. Such a mannequin would also permit training for law enforcement and security personnel in relatively rare emergency situations where drastic measures are required to ensure that sufficient force is applied to the limb to deliberately cause damage in order to restrain or otherwise control an individual in situations which call for excessive force.

SUMMARY OF THE INVENTION

BRIEF DESCRIPTION OF THE DRAWINGS

In drawings which illustrate embodiments of the invention,

FIG. 5A is a partially exploded sectional side view of the joint of FIG. 1 with the upper arm separated from the forearm;

FIG. 5B is a sectional side view of the joint of FIG. 1 showing the first member positioned with respect to the second member in the second position;

DETAILED DESCRIPTION

General Description

Figure 3A:
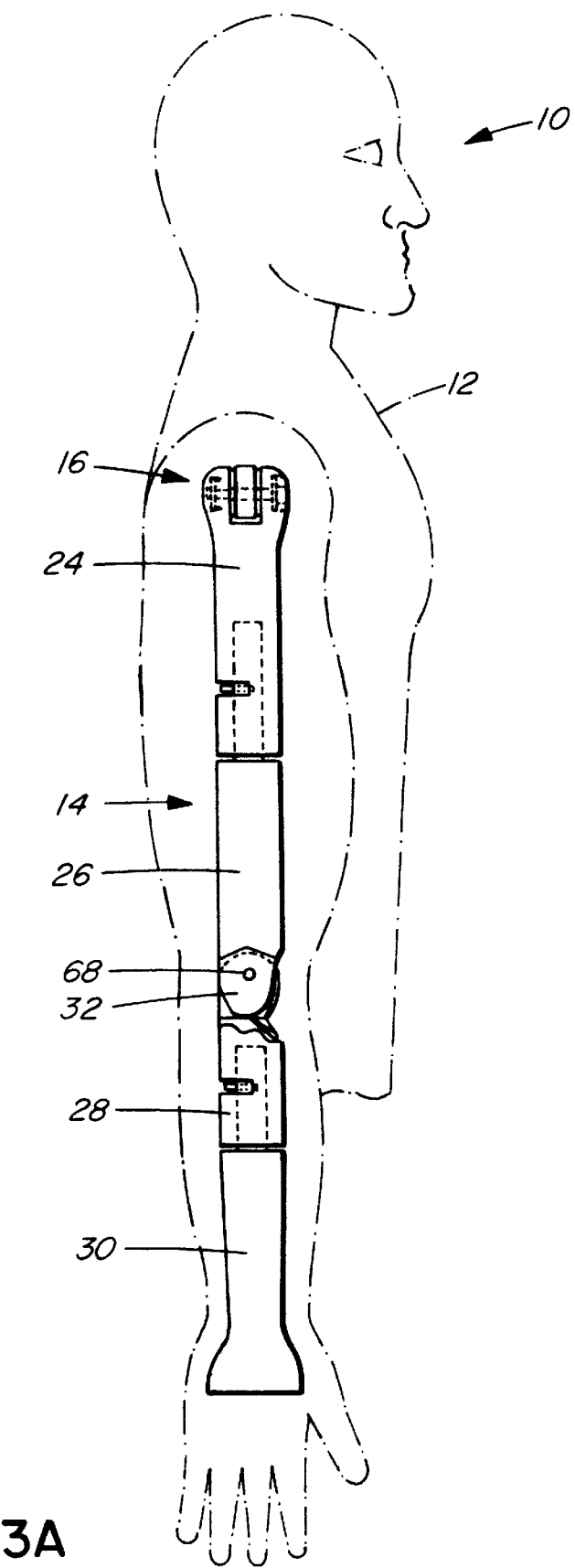
FIG. 3A is a side view of the arm of FIG. 1 joined to a mannequin target.
Figure 3B:
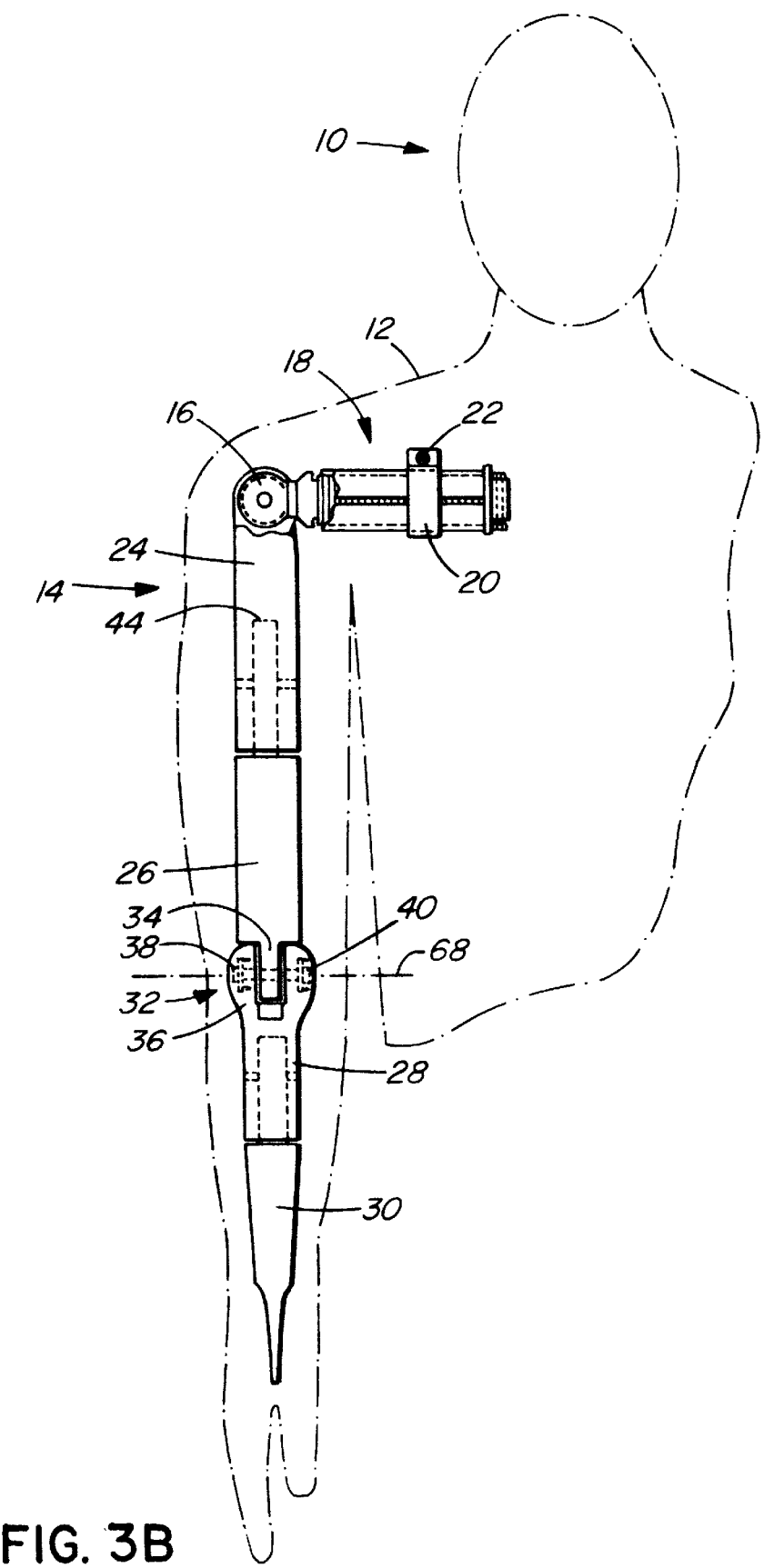
FIG. 3B is a front view of the arm of FIG. 1 joined to a mannequin target.

Referring initially to FIGS. 3A and 3B, a testing and training mannequin 10 is partially shown in side view (FIG. 3A) and front view (FIG. 3B). Mannequin 10 may be used as a target for training police officers and security personnel, as well as for martial arts sport training. Mannequin 10 is generally of human form with soft resilient covering 12 formed thereon to simulate a human form. Right arm 14 is depicted but it should be understood that a similar left arm would be attached to the other side of mannequin 10. Arm 14 is rotatably connected at a shoulder region of mannequin 10 by means of rotatable shoulder joint 16 connected to shoulder support member 18 which is rigidly attached to the torso of mannequin 10 by means of split cylindrical shaft members 154 attached to a suitable structural component (not shown) of the inner chest area of mannequin 10.

Arm 14 includes four general components namely upper humerus portion 24, lower humerus portion 26, upper forearm portion 28 and lower forearm and wrist portion 30. Upper humerus portion 24 and lower humerus portion 26 together form generally a proximal part of the target whereas upper forearm portion 28 and lower forearm and wrist portion 30 generally form a distal part of mannequin 10.

Figure 4A:
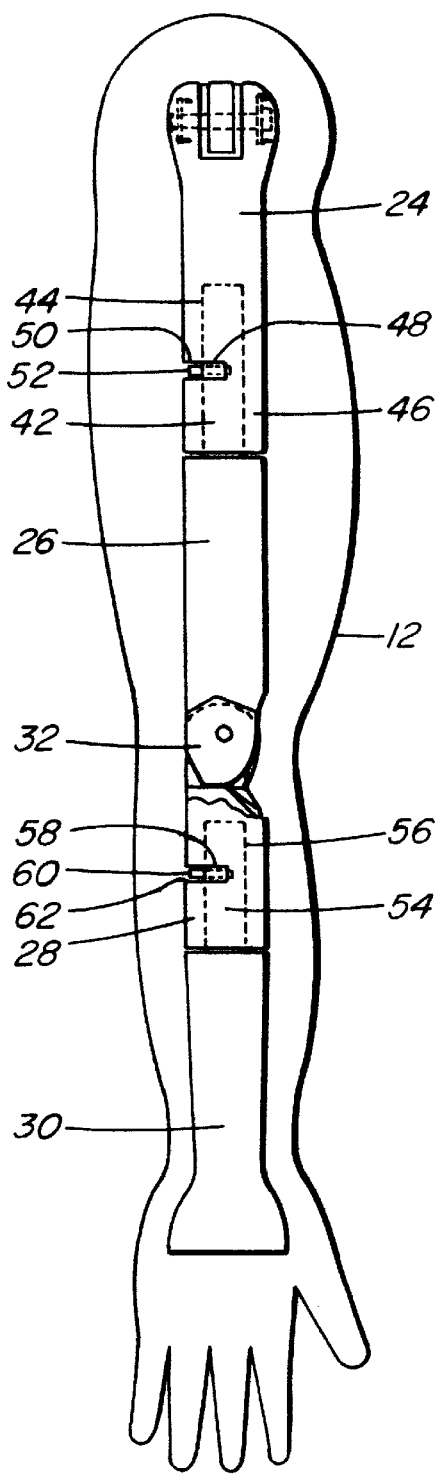
FIG. 4A is a side view of the arm of FIG. 1 showing the target arm in the second position.
Figure 4B:
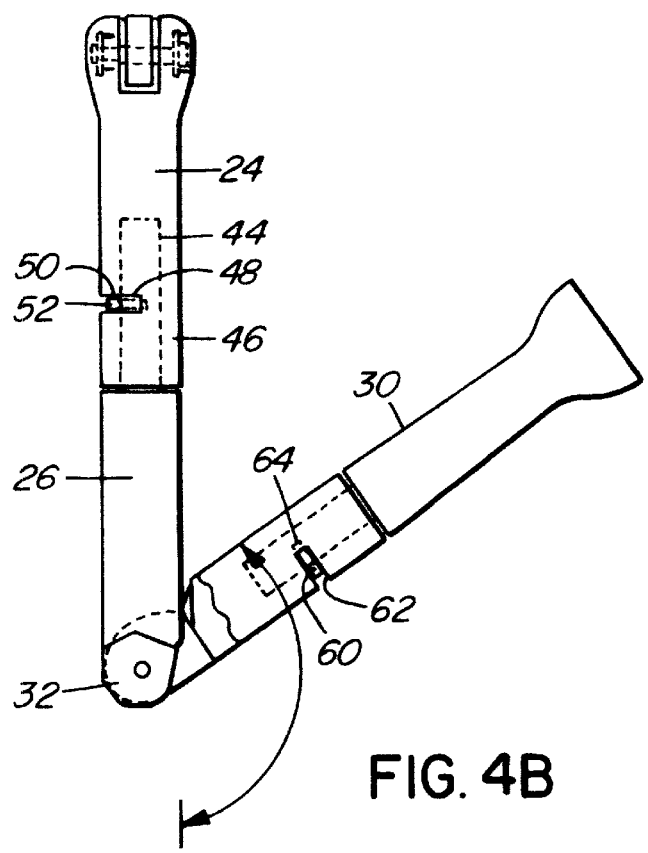
FIG. 4B is a side view of the arm of FIG. 1 in the fully flexed position showing the first member positioned with respect to the second member in the first position.

Joint 32 rotatably connects lower humerus portion 26 to upper forearm portion 28 for rotatable movement between a first position, best seen in FIG. 4B and a second position seen in FIG. 3A. The first position emulates the mannequin 10 with arm 14 in a fully flexed position, whereas the second position emulates an anatomical position of arm 14 with medial rotation of lower forearm and wrist portion 30.

As seen best in FIG. 3B joint 32 includes a flange 34 which is referred to as a first member attachable to lower humerus portion 26 which together with upper humerus portion 24 forms a proximal part of mannequin 10. Joint 32 also includes a pair of opposed securing members 36 best seen in FIG. 5C, which is referred to as a second member attachable to upper forearm portion 28 which, together with lower forearm and wrist portion 30, forms a distal part of mannequin 10.

Figure 1:
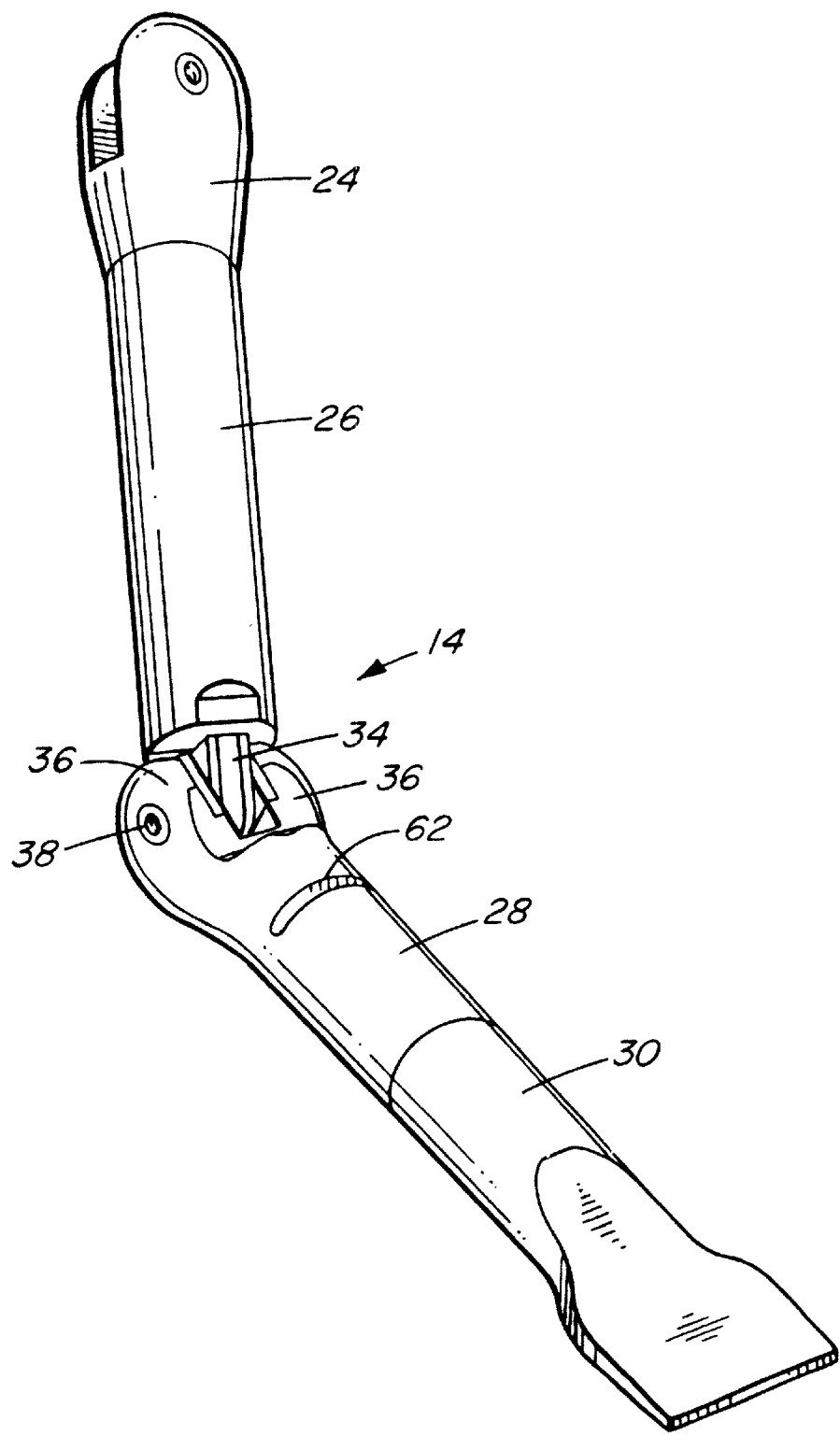
FIG. 1 is a perspective view of an arm of a target which includes a joint according to a first embodiment of the invention.

FIG. 1 depicts arm 14 in an intermediate position between the first or fully flexed position depicted in FIG. 4B and the second position depicted in FIG. 3A. Upper humerus portion 24 is rotatably connected to lower humerus portion 26 for rotation about the longitudinal axis of portion 26 from the anatomical position medially and laterally. Similarly, lower forearm and wrist portion 30 is rotatably connected to upper forearm portion 28 for rotation about the longitudinal axis of upper forearm arm portion 28 from the anatomical position medially and laterally.

Lower humerus portion 26 is rotatably connected to upper forearm portion 28 for elbow flexing rotation about axis 68 to emulate the elbow joint of mannequin 10 by means of flange 34 connected to each of the opposed parallel securing members 36 by bolt 40 connected to nut 38 (FIG. 3B). This permits rotation of upper forearm portion 28 with respect to lower humerus portion 26 about axis 68 along a plane parallel with the plane defined by flange 34, between the first and second positions of arm 14.

Shoulder Attachment of Arm

The attachment of arm 14 to support member 18 by means of shoulder joint 16 will now be discussed with reference to FIGS. 6A and 6B. Support member 18 is rotatably connected to the torso of mannequin 10 by means of washer 164 and bolt 158. Shoulder joint 16 connects support member 18 to the proximal part 130 of upper humerus portion 24. Joint 16 is rotatable about axis 132 to permit positioning of arm 14 at any point within a range of positions between that adjacent the torso of the mannequin as depicted in FIG. 3B and positions extending at an angle outwardly therefrom about axis 132 (i.e. abduction). Proximal part 130 includes a pair of opposed shoulder securing members 134 which define a shoulder flange receptacle 136. Support member 18 includes shoulder flange 138 which is dimensioned to fit within receptacle 136 for free rotation about axis 132. This is generally similar to the means of securing joint 32 except that no detent 102 and face 104 are present to interfere with the rotation of arm 14 with respect to member 18.

A pair of pads 140 are positioned adjacent flange 138 and a pair of pads 142 are positioned adjacent inner faces of securing members 134. Pads 140 remain secured against flange 138 and pads 142 remain secured adjacent members 134. Rotation of humerus portion 24 with respect to support member 18 will cause movement of pad 142 with respect to pad 140 which remains stationary with flange 138. Bolt 144 extends through aligned openings in pads 140 and 142 as well as flange 138 and each shoulder securing member 134 in a manner similar to that described with respect to joint 32. Washer 146 is positioned adjacent the head of bolt 144. Nut 148, which is similar to nut 100 is threadedly engaged with bolt 144. This rotatably secures flange 138 within receptacle 136 and permits rotational movement of arm 14 with respect to flange 138. As well the force required to move upper humerus portion 24 with respect to flange 138 may be increased or decreased by tightening or loosening nut 148 with respect to bolt 144.

Figure 6B:
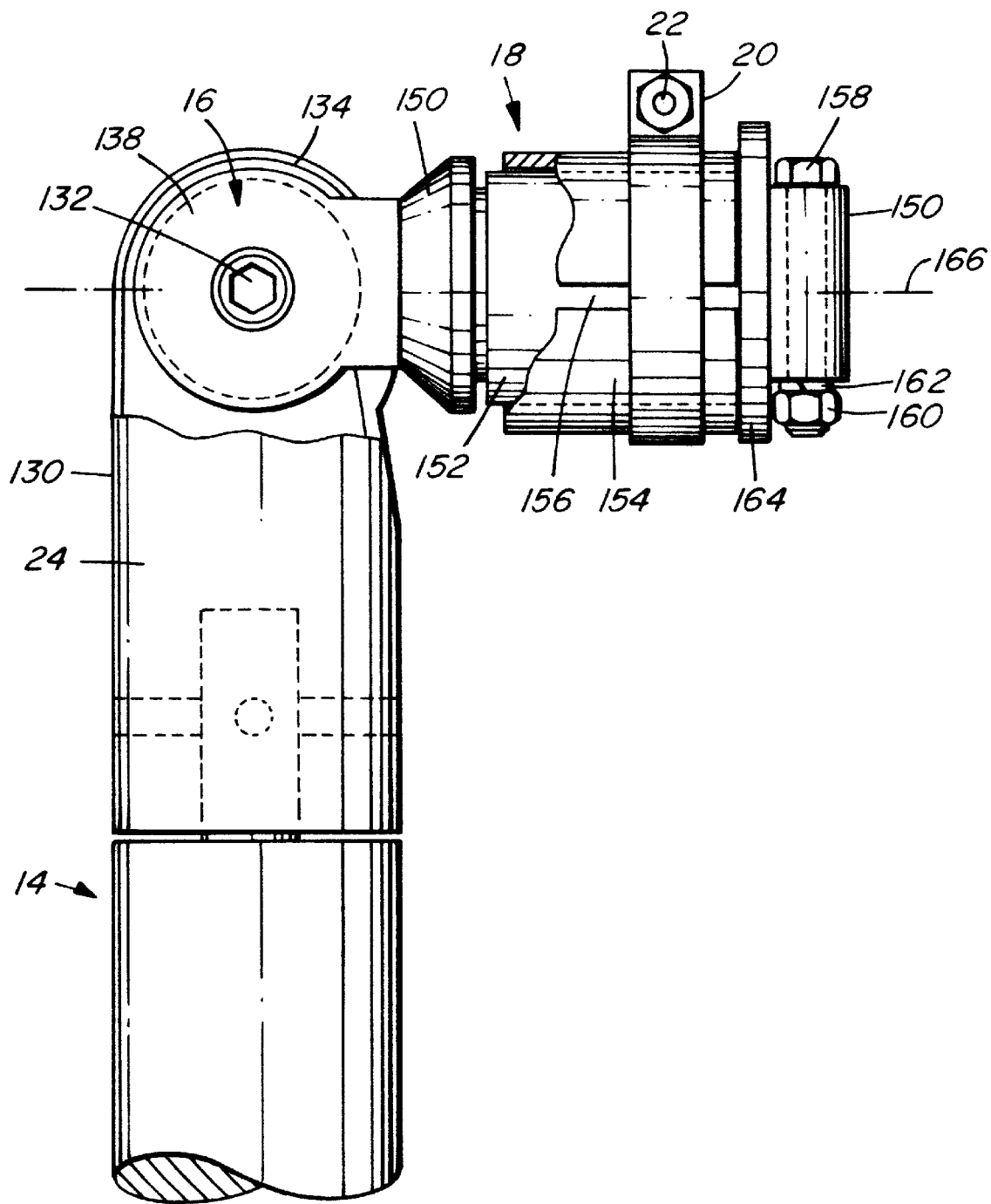
FIG. 6B is a sectional front view of the shoulder joint of FIG. 6A taken along line 6B—6B of FIG. 6A.

Referring to FIG. 6B flange 138 is connected to shaft extension 150 which is substantially surrounded by braking pad 152. Split cylindrical shaft member 154 rigidly attached to mannequin extends about most of the outer surface of pad 152. Slot 156 in shaft member 154 permits adjustable tightening of member 154 about pad 152 to increase or decrease the pressure of pad 152 on shaft extension 150. Shaft extension 150 is rotatably secured within shaft member 154 by means of bolt 158 secured by nut 160 with lock washer 162 interposed between bolt 160 and shaft extension 150. Washer 164 abuts bolt 158 and nut 160 to prevent movement of shaft extension 150 outwardly in a direction toward arm 14.

It can be seen that depending on the pressure applied by shaft member 154 which causes pad 152 to apply pressure on shaft extension 150, the level of force required to rotate flange 138 about axis 166 may be varied. This depends on how tight clamp 20 is secured about shaft member 154 which tightness is adjusted by tightening or loosening bolt 22 and corresponding nut (not shown). This permits circumduction of the arm in the frontal plane and securing the arm in any desired position by tightening or loosening bolt 22.

Axial Rotation

Figure 4C:
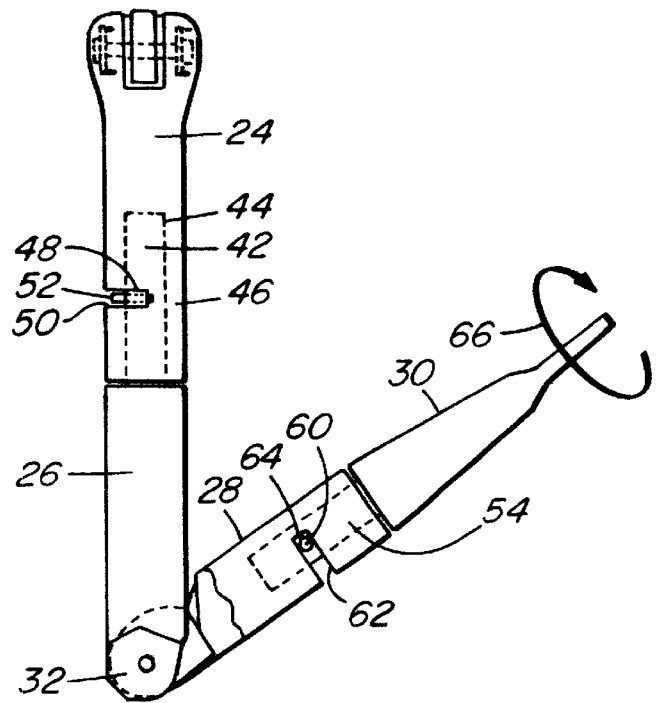
FIG. 4C is a side view of the arm of FIG. 1 in the fully flexed position with medial rotation of the forearm and lower forearm and wrist portion.

The rotatable attachment and rotation of lower humerus portion 26 with respect to upper humerus portion 24 and upper forearm portion 28 with respect to lower forearm and wrist portion 30 will be discussed with particular reference to FIGS. 4A and 4C.

Referring initially to FIG. 4A, lower humerus portion 26 includes boss 42 extending axially in a direction toward and into a corresponding opening 44 journalled axially into lower end 46 of upper humerus portion 24. Boss 42 includes lateral opening 48 aligned with corresponding semi-circular slot 50 of upper humerus portion 24. Pin 52 extends from opening 48 into slot 50 to rotatably secure lower humerus portion 26 within upper humerus portion 24 for movement of pin 52 within slot 50 thereby controlling axial rotation of lower humerus portion 26 with respect to upper humerus portion 24.

Figure 2:
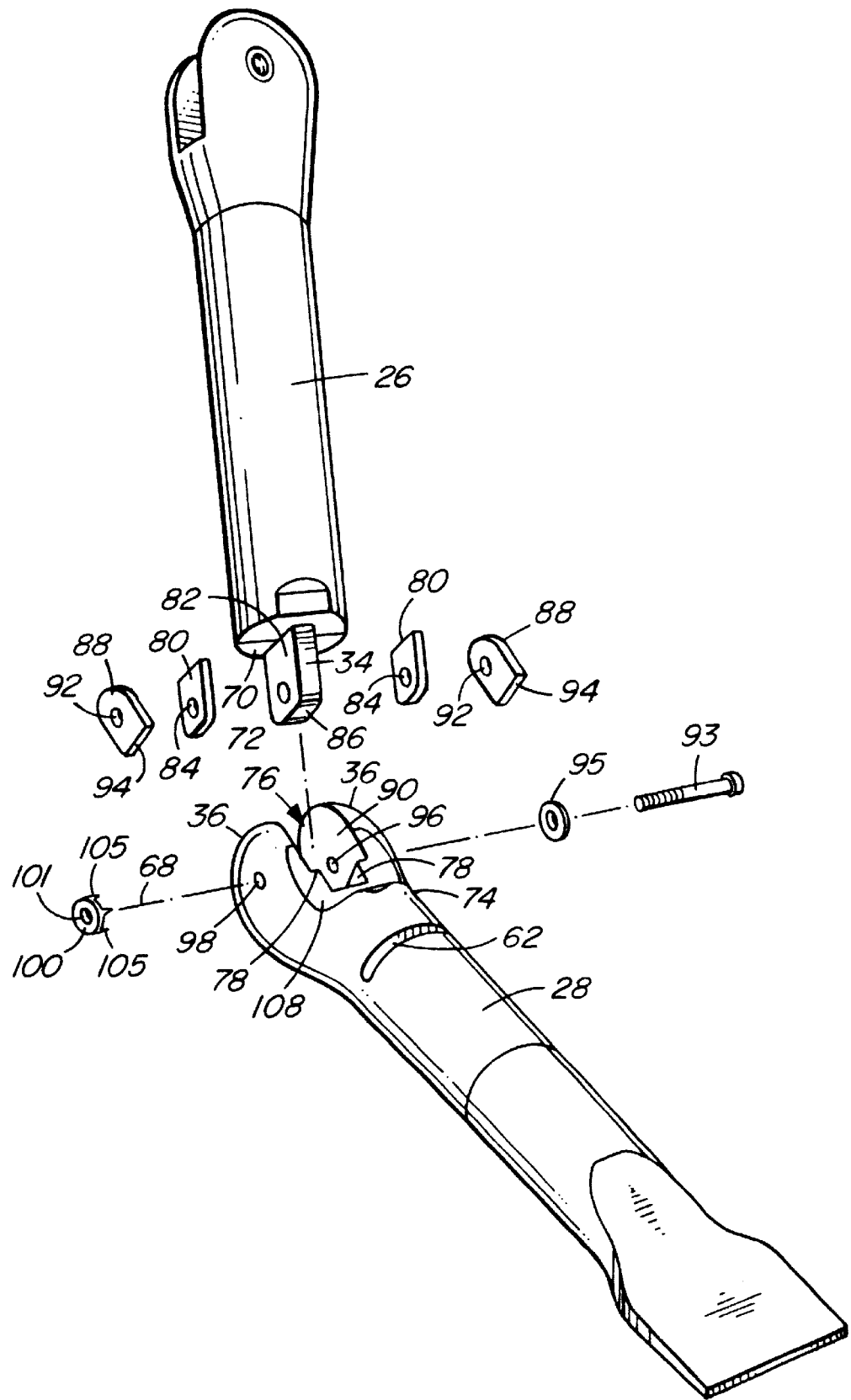
FIG. 2 is a perspective exploded view of the arm of FIG. 1.

Similarly, lower forearm and wrist portion 30 includes boss 54 extending upwardly into opening 56 of upper forearm portion 28. Boss 54 includes lateral opening 58 which secures pin 60 therein. Pin 60 travels in slot 62 to permit axial rotation of lower forearm and wrist portion 30 with respect to upper forearm portion 28. Slot 62 is best seen in FIGS. 1 and 2. As well slot 62 may be seen in a position with lower forearm and wrist portion 30 parallel to the body of mannequin 10 in FIG. 4B following rotation in the direction of arrow 66. Slot 62 is shown in FIG. 4C with lower forearm and wrist portion 30 in a supinated position with the palm of the hand of mannequin 10 facing downwardly and with pin 60 contacting an end wall 64 of slot 62. In that position end wall 64 prevents further rotational movement of pin 60 in slot 62 and consequently further rotation of lower forearm and wrist portion 30 with respect to upper forearm portion 28 in the direction of arrow 66. Pin 52 in slot 50 and pin 60 in slot 62 retain respective lower humerus portion 26 and lower forearm and wrist portion 30 rotationally secured to corresponding upper humerus portion 24 and upper forearm portion 28, respectively.

Flexion

The rotation of upper forearm portion 28 with respect to lower humerus portion 26 about axis 68, will be discussed with particular reference to FIGS. 2, 5A, 5B and 5C.

As best seen in FIG. 2, flange 34 extends longitudinally from the lower end 70 of lower humerus portion 26. Flange 34 includes lateral opening 72 extending therethrough and aligned with axis 68 when lower humerus portion 26 is joined to upper forearm portion 28 as depicted in FIG. 1. Proximal end 74 of upper forearm portion 28 includes a pair of opposed parallel spaced securing members 36. Members 36 define flange receptacle 76 in the region between members 36. Receptacle 76 includes a lower narrower region defined by a pair of opposed ledge 78. One of a pair of pads 80 are positioned adjacent faces 82 of flange 34. Pads 80 are dimensioned to fit between end 70 at one end and adjacent bottom 86 of flange 34 at the other end.

A second pair of pads 88 are positioned adjacent corresponding pads 80, and when in use as depicted in FIG. 1, are positioned adjacent inner faces 90 of each securing members 36. Second pads 88 include opening 92 extending laterally therethrough and aligned with openings 84 and 72. The lower end 94 of pads 88 rests against corresponding ledge 78 of securing members 36.

Because the upper end of pads 80 are positioned adjacent end 70, pads 80 will remain in position adjacent respective faces 82 of flange 34 irrespective of rotational movement of upper forearm portion 28 with respect to lower humerus portion 26 about axis 68. Similarly, the fact that end 94 is positioned adjacent corresponding ledge 78 of securing members 36 means that pads 88 will remain in position adjacent corresponding faces 90 irrespective of rotation of lower humerus portion 26 with respect to lower upper forearm 28 when in use.

Lower humerus portion 26 and upper forearm portion 28 are rotatably attached to one another for rotation about axis 68 by means of bolt 93 inserted through washer 95 and then through opening 96 in one of the securing members. Bolt 93 then passes through openings 92 and 84 of one each of pads 88 and 80, through opening 72, and through openings 84 and 92 of the other of pads 80 and 88. Bolt 93 then extends through opening 98 of the other securing member 36. Securing nut 100 having an opening 101 with threads matching the threads of bolt 93 is used to secure bolt 93 in position along axis 68. Nut 100 includes a plurality of pointed lateral securing members 105 which pierce the shell of securing member 36 adjacent nut 100 and are driven into securing member 36 as bolt 93 is tightened into nut 100.

It will also be readily appreciated that tightening or loosening bolt 93 in nut 100 will increase or decrease the pressure on adjacent pads 88 and 80. This will result in more or less force required to rotate upper forearm portion 28 with respect to lower humerus portion 26 about axis 68 between the first position, depicted in FIG. 4B and the second position depicted in FIG. 4A.

Figures 5C, 6A:
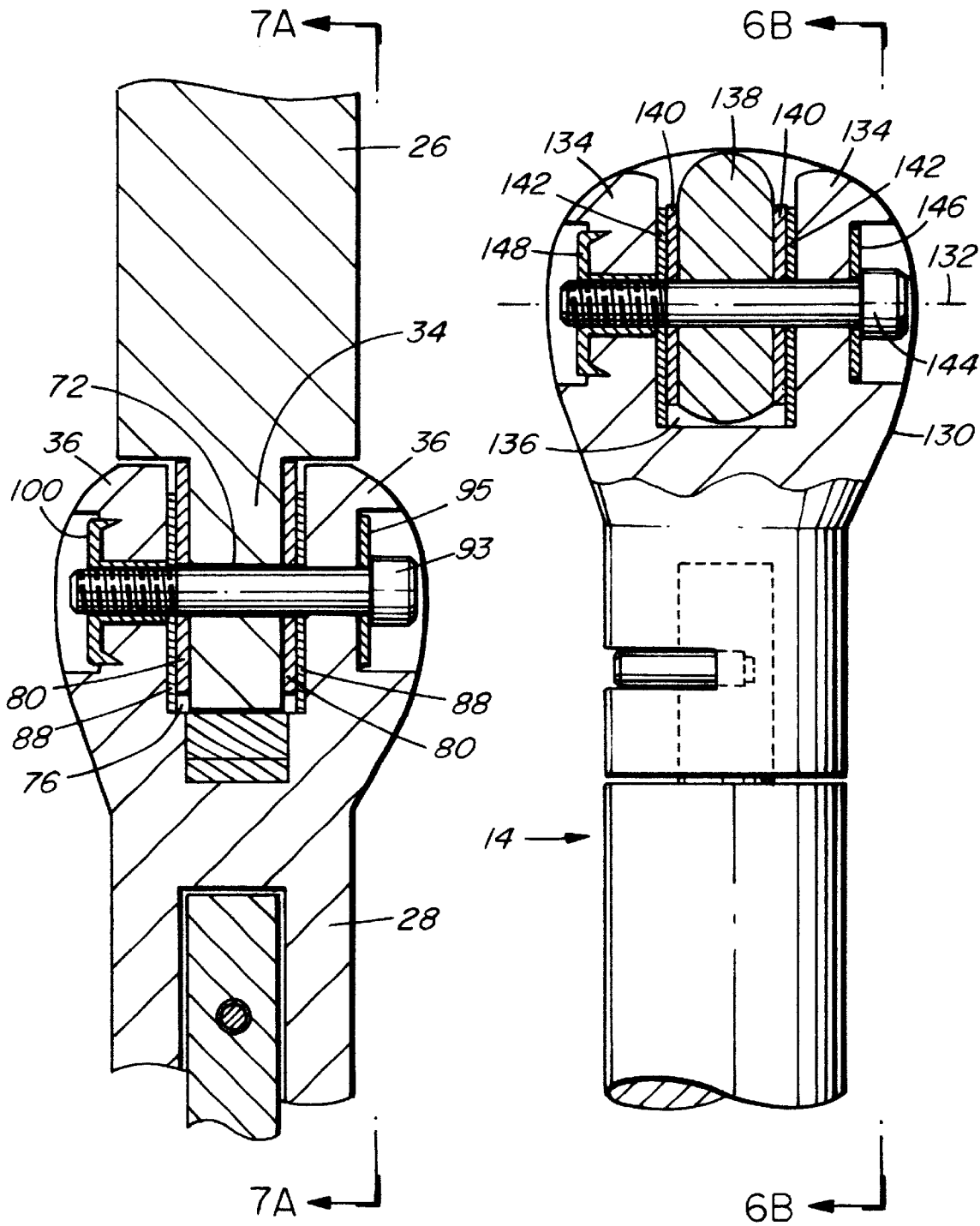
FIG. 5C is a sectional front view of the joint of FIG. 5B in the second position taken along line 5C—5C of FIG 5B.
FIG. 6A is a side sectional view of the shoulder joint attachable to the upper arm which in turn is attached to the joint of FIG. 1.

Referring to FIGS. 5A, 5B and 5C, flange 34 includes a detent 102 on a lower face of flange 34. The bottom surface 103 of flange receptacle 76 includes face 104 formed thereon. Detent 102 is positioned with respect to face 104 to rest against face 104 when lower upper forearm 28 is in the second position with respect to lower humerus portion 26.

Flange 34 further includes semi-circular region 106 at a forward portion of flange 34. Semi-circular region 106 permits free rotation of flange 34 within flange receptacle 76 without contacting face 104 when upper forearm portion 28 is rotated about axis 68 in relation to lower humerus portion 26 between the first position and second position of portions 26 and 28. Detent 102 is positioned with respect to face 104 to contact face 104 when upper humerus portion 24 and lower humerus portion 26 are in the second position. Semi-circular region 106 permits rotation between the second position and the first position without interference from face 104. Consequently, the means of adjusting the force required to move between the first position and second position of lower humerus portion 26 with respect to upper forearm portion 28 is to tighten and loosen bolt 93 in nut 100 as previously described.

To further facilitate free movement of lower humerus portion 26 with respect to upper forearm portion 28 and to permit full flexion to the position depicted in FIG. 4B, proximal end 74 includes angled indent 108. Indent 108 is positioned such that it contacts face 110 when lower humerus portion 26 and upper forearm portion 28 are in the first position. This prevents further movement past the first position in a direction away from the second position.

Hyperextension

Figure 7C:
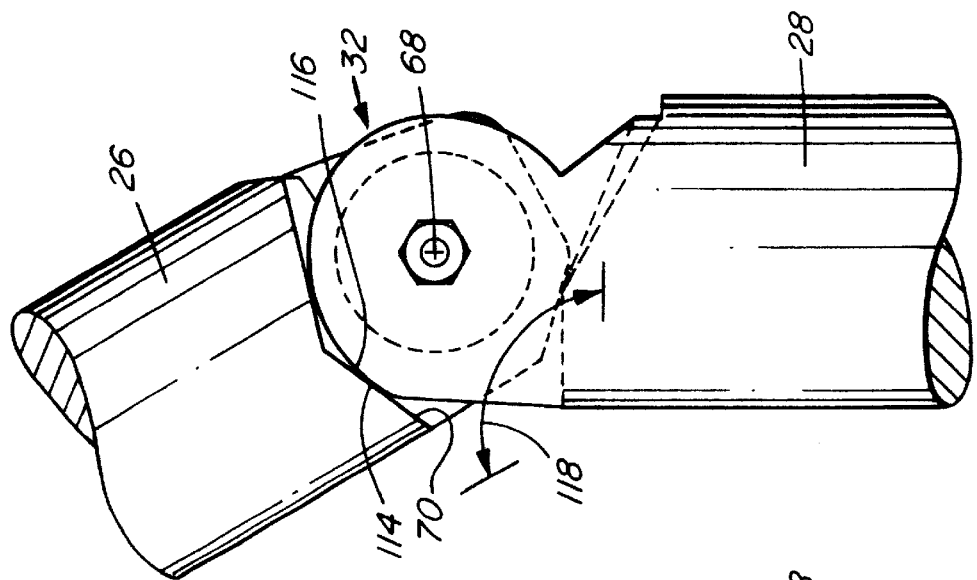
FIG. 7C is a sectional side view of the joint of FIG. 7A and 7B.
Figure 7B:
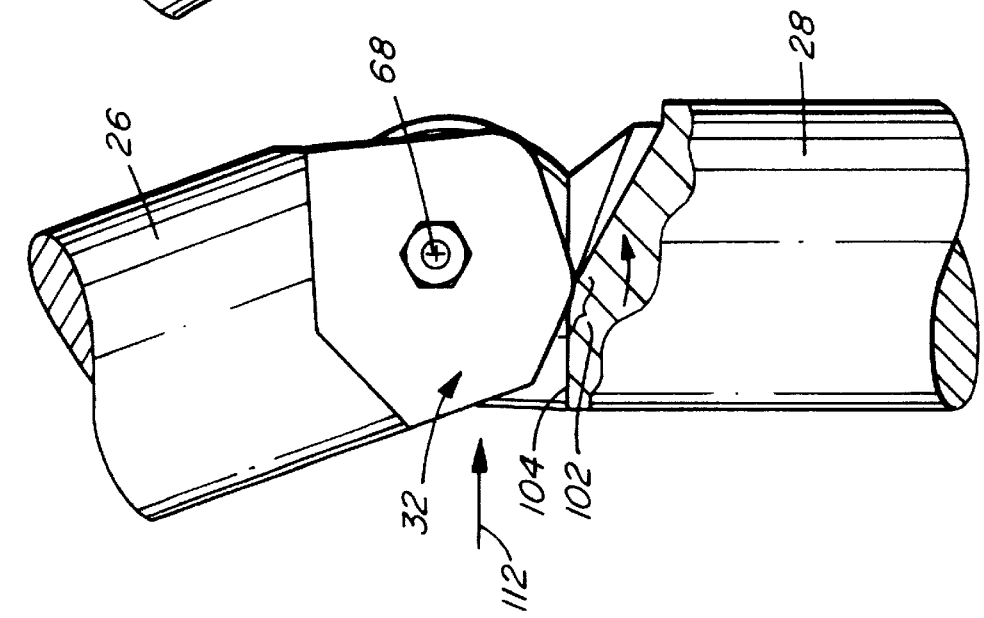
FIG. 7B is a sectional side view of the joint of FIG. 7A with the members in the third or hyperextended position.

The hyperextension of joint 32 will be discussed with reference to FIGS. 7A, 7B and 7C. This represents the movement of lower humerus portion 26 with respect to upper forearm portion 28 from the second position, depicted in FIG. 7A to the third or hyperextended position depicted in FIG. 7C. As previously discussed, when portions 26 and 28 are in the second position detent 102 rests against face 104. This prevents movement from the second position toward the third position in a direction away from the first position.

Either one or both of detent 102 or face 104 may be constructed of resiliently deformable material. As an alternative both detent 102 and face 104 may be constructed as a unitary component of lower humerus portion 26 and upper forearm portion 28, respectively. The appropriate material to provide the appropriate resiliency or hardness of detent 102 and/or face 104 is selected to permit minimal deforming and compression of one or both of detent 102 or face 104 which is sufficient to enable detent 102 to move past face 104 when portions 26 and 28 are moved from the second position to the third or hyperextended position. The amount of force required is equal to a predetermined force which generally conforms to the level of force required to move a typical human suspect or martial art opponent's elbow joint from an anatomical position to a hyperextended position in order to restrain that target individual. Similarly materials can be selected to provide a predetermined force which approximates the amount of force required to move the knee joint of a typical suspect or martial arts opponent from an anatomical position to a hyperextended position in order to restrain or otherwise force compliance of that individual. The predetermined force can vary based on differences in the ability of the target to be emulated to resist movement of the humerus or upper arm with respect to the forearm.

However, we have found that by using a shore hardness 75D urethane (manufactured by Uniroyal Chemical, US) provides the strength, compression qualities and durability desired in this technology. Detent 102 can be manufactured to a particular size requirement to demonstrate the level of resistance desired. For example, our research has found that a breaking force of approximately 443.14 N (Newtons) is required to hyperextend (break) a non-resisting knee of the 50 percentile male. The 99 percentile adult male's knee would require 536.18 N of force while the 1 percentile male knee would require only 319.02 N of force. The elbow joint calculations for this same group would require 274.71, 341.18 and 257.06 N of force respectively. An adult female's elbow would potentially require only 208.24, 314.61 and 208.24 N of force to hyperextend a non-resisting elbow. Various methods of increasing the resistance to hyperextend the joint include changing the hardness of urethane, adjusting, the size of the detent 102, adjusting the strength of a compressible or torsion spring or the amount of the compressible ball extending above face 104 being depressed by detent 102 or tightening bolt 93 in nut 100.

Application of a predetermined force in the direction of arrow 112 will cause sufficient force to be applied to detent 102 and face 104 to cause them to be deformed and compressed as they move past one another when portions 26 and 28 are moved past the second position toward the third position. This deforming and compressing allows portions 26 and 28 to be moved to a position between the second and third position where the detent and face are in compressed contact, as depicted in FIG. 7B and eventually to the third or hyperextended position as depicted in FIG. 7C. When in the third position, semi-circular part 114 on each securing member 36 contacts corresponding stops 116 on lower end 70. This prevents further movement of portions 26 and 28 about axis 68 past the third position in a direction away from the second position. The third position corresponds generally to a hyperextended position of a human elbow or knee joint at angle 118 as depicted in FIG. 7C, without causing damage to that joint or related structural components.

Figure 7A:
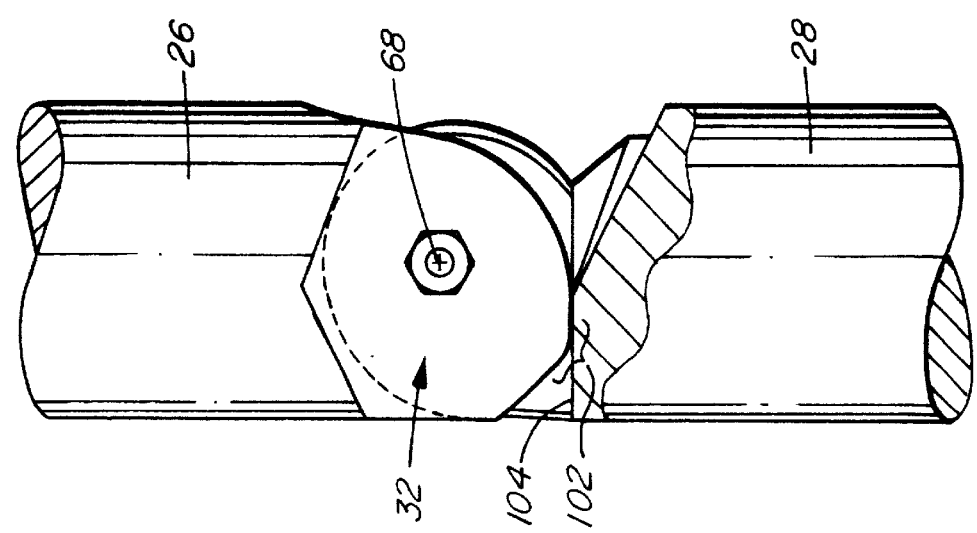
FIG. 7A is a sectional side view of the joint of FIG. 1 with the first and second members in the second position taken along lines 7A—7A in FIG. 5C.

Portions 26 and 28 may be moved back from the third position to the second position by applying force in a direction opposite to arrow 112 thereby forcing detent 102 past face 104 in the second position as depicted in FIG. 7A. In most applications the force required to move detent 102 past face 104 in the reverse direction from the third position to the second position will be the same as the predetermined force required to move portions 26 and 28 from the second position to the third position. However the detent or face can be designed to provide different levels of resiliency on each side of the detent to provide for a different force requirement to move portions 26 and 28 in one direction, as compared to the opposite direction.

Second Embodiment

Figure 8C:
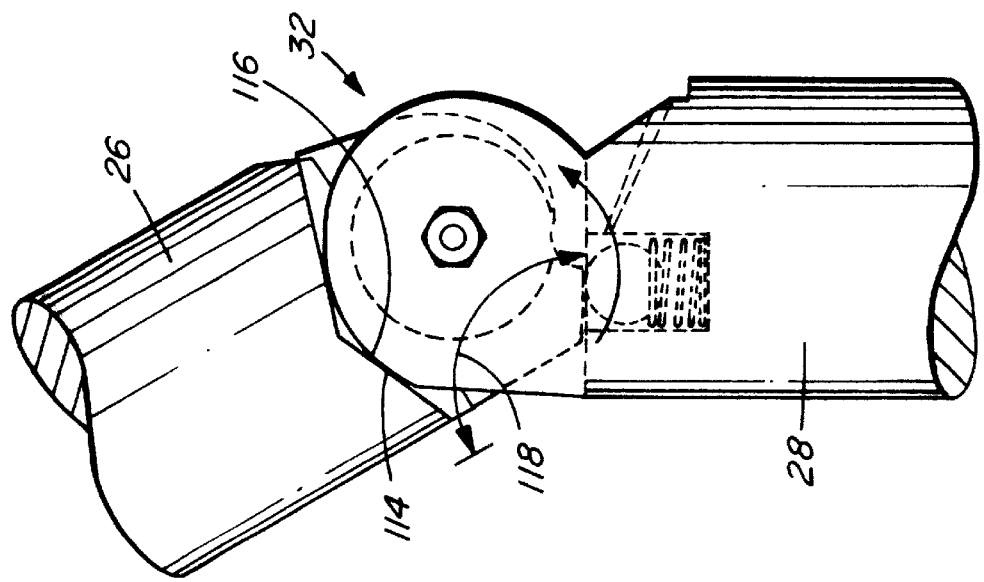
FIG. 8C is a sectional side view of the joint of FIG. 8A showing the first and second members in the third or hyperextended position.
Figure 8B:
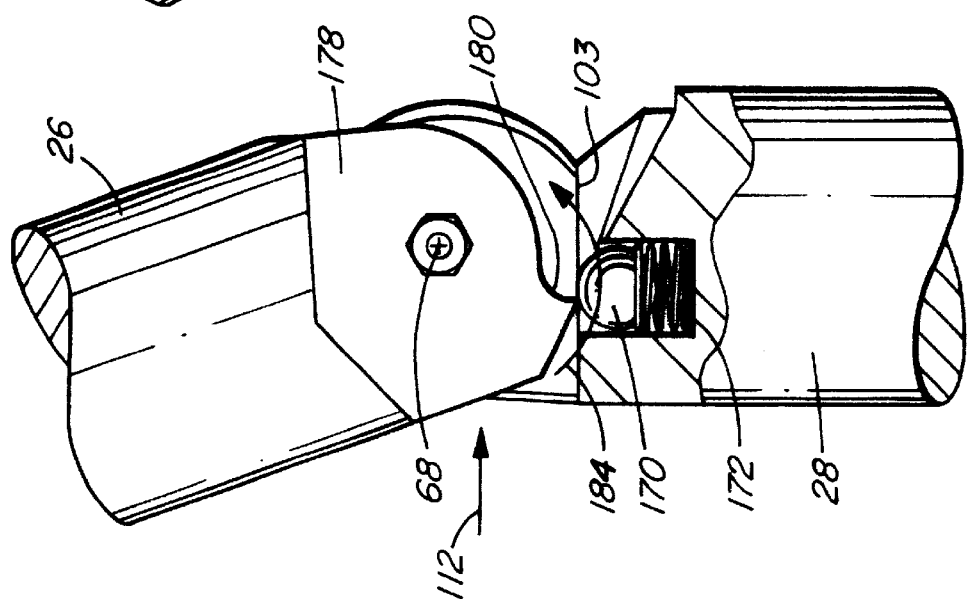
FIG. 8B is a sectional side view of the joint of FIG. 8A showing the first and second members between the second and the third or hyperextended position.
Figure 8A:
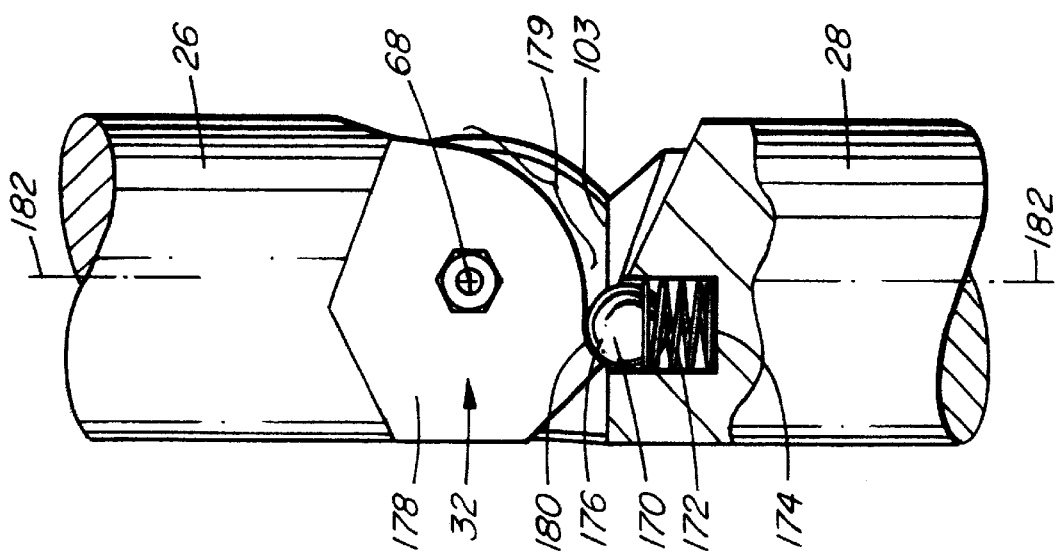
FIG. 8A is a sectional side view of a joint according to a second embodiment of the invention showing the joint with the first and second members thereof in the second position.

A second embodiment of the invention is depicted in FIGS. 8A, 8B and 8C. In most respects, the second embodiment is similar to the first embodiment with joint 32 rotatably connecting lower humerus portion 26 to upper forearm portion 28 for rotation about axis 68.

However instead of detent 102 and face 104, the second embodiment comprises ball 170 rotatably seated in the end region of spring 172. Ball 170 and spring 172 are contained within channel 174 formed in the surface 103 and positioned such that segment 176 of ball 170 extends above surface 103.

Flange 178 includes lower hook 180 formed in a lower region of flange 178. Channel 174 is offset from the longitudinal axis 182 of portions 26 and 28 and hook 180 is positioned such that it engages segment 176 when portions 26 and 28 are in the second position, as depicted in FIG. 8A.

Application of the predetermined force on portions 26 and 28 in the direction generally of arrow 112, causes hook 180 to move in the direction of arrow 184 as lower humerus portion 26 is rotated with respect to upper forearm portion 28 to a position between the second and third positions, as depicted in FIG. 8B. This movement causes downward pressure to be applied on ball 170 against spring 172 lowering ball 170 below surface 103.

Further movement of lower humerus portion 26 with respect to upper forearm portion 28 will cause portions 26 and 28 to be moved to the third or hyperextended position as depicted in FIG. 8C positioned at angle 118 with respect to one another. Stop 116 engages semicircular part 114 to prevent further movement past the third position in a direction away from the second position.

Portions 26 and 28 may be moved in the reverse direction from the third position to the second position by applying pressure in a direction opposite to that of arrow 112 in FIG. 8B thereby moving hook 180 to a position where it aligns with ball 170 permitting ball 170 to rise upwardly due to the biasing force of spring 172 back into engagement with hook 180 with portions 26 and 28 to the second position depicted in FIG. 8A.

Flange 178 includes semi-circular portion 179 of lessor radius than hook 180 to provide sufficient clearance to permit free movement of portions 26 and 28 between the first and second positions without interference from ball 170.

Third Embodiment

Figure 9C:
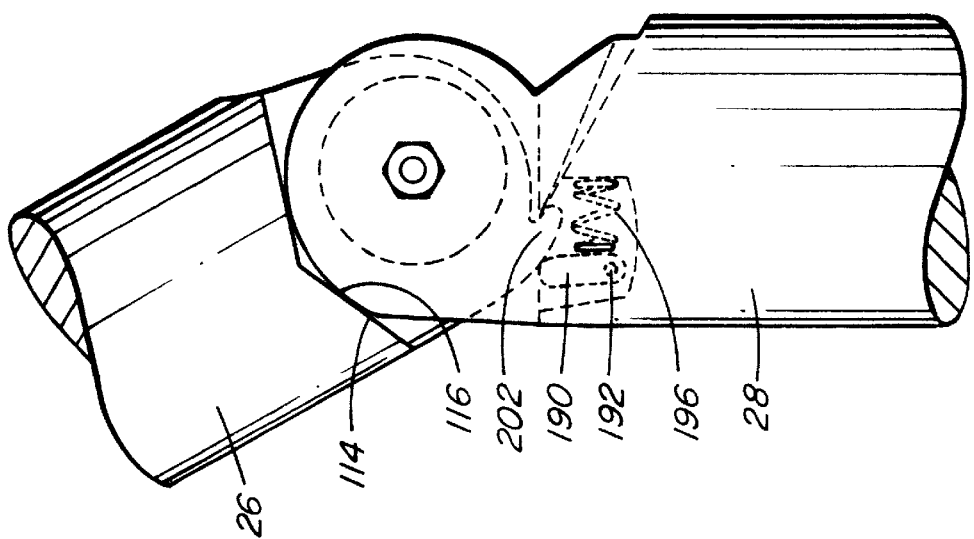
FIG. 9C is a sectional side view of the joint of FIG. 9A showing the first and second members in the third or hyperextended position.

The third embodiment will be discussed with reference to FIGS. 9A, 9B and 9C. Again the principal components of the third embodiment are similar to that of the first embodiment. However the third embodiment replaces the detent 102 and face 104 with toggle 190 which is pivotally connected to upper forearm portion 28 by means of pivot pin 192. Channel 194 is formed laterally in surface 103 of portion 28. Spring 196 is positioned laterally within channel 194 with one end contacting end wall 198 of channel 194 and the other end of spring 196 contacting toggle 190. Flange 200 includes hook 202 positioned to contact toggle 190 when toggle 190 is in an upright position, and when portions 26 and 28 are in the second position, all as depicted in FIG. 9A.

Figure 9B:
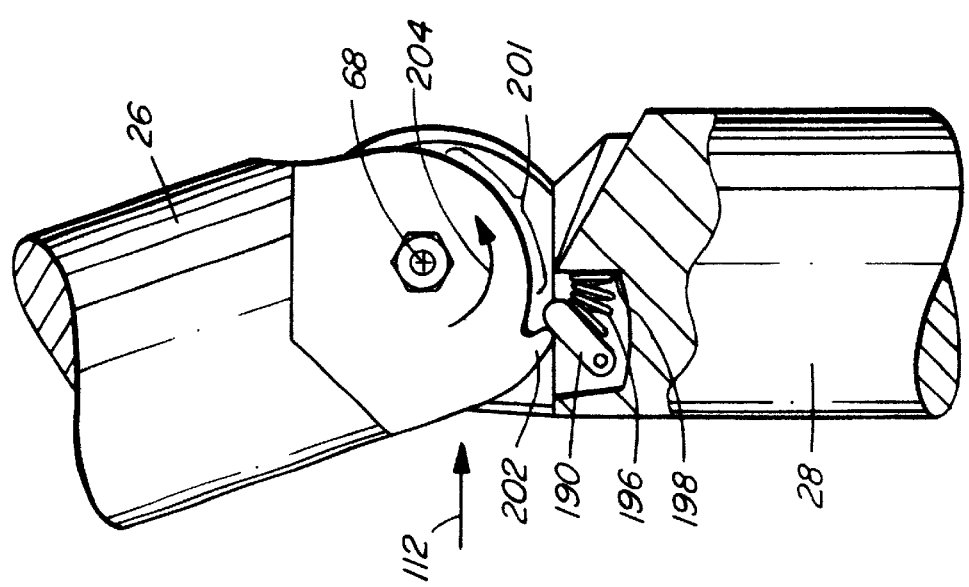
FIG 9B is a sectional side view of the joint of FIG. 9A showing the first and second members. Between the second and the third or hyperextended positions.
Figure 9A:
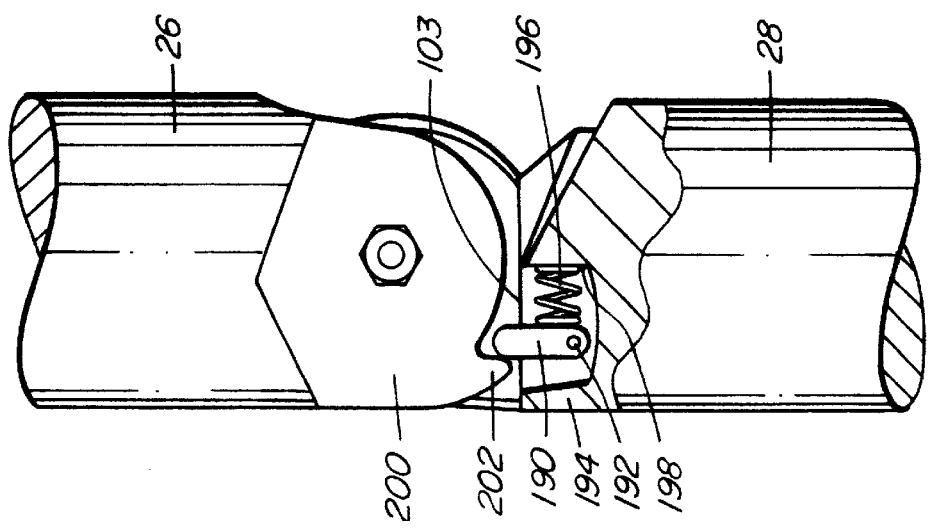
FIG. 9A is a sectional side view of a joint according to a third embodiment of the invention showing the joint with the first and second members thereof in the second position.

Referring to FIG. 9B upon application of the predetermined force in the direction of arrow 112 sufficient force is exerted on portions 26 and 28 to enable them to be moved past the second position in the direction of arrow 204 to an intermediate position between the second position and the third position, as depicted in FIG. 9B. In this intermediate position toggle 190 is deflected by hook 202 against the force exerted by spring 196.

Further movement of portions 26 and 28 eventually results in portions 26 and 28 positioned in the third or hyperextended position depicted in FIG. 9C. As before, stop 116 contacts semicircular part 114 to prevent further movement past the third position in a direction away from the second position.

Portions 26 and 28 may be moved from the third position to the second position by applying force in a direction opposite to arrow 112 causing hook 202 to be moved past toggle 190 which pivots outwardly in a direction opposite arrow 112. Once hook 202 passes toggle 190 spring 196 forces toggle against hook 202 to retain portions 26 and 28 in the second position, depicted in FIG. 9A.

Flange 200 includes semi-circular portion 201 of a radius less than the distance from axis 68 to hook 202. This permits movement of portions 26 and 28 between the second position and first position without interference from toggle 190.

Fourth Embodiment

Figure 10C:
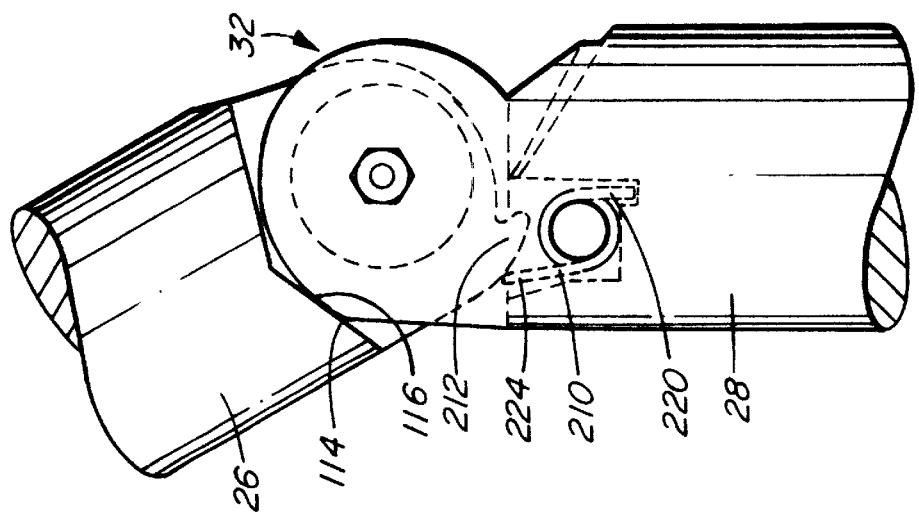
FIG. 10C is a sectional side view of the joint of FIG. 10A showing the first and second members in the third or hyperextended position.

The fourth embodiment will now be discussed with reference to FIGS. 10A, 10B and 10C. This embodiment is similar to that of the first embodiment except that detent 102 and face 104 are replaced by spring 210 connected to upper forearm portion 28 engaging hook 212 on flange 214.

Spring 210 is a circular spring wound about core 216 housed within opening 218 in surface 103 of portion 28. Spring 210 includes lower extension portion 220 which extends into hole 222 in the bottom of opening 218. This retains spring 210 in an orientation with lower extension portion 220 extending downwardly.

Figure 10B:
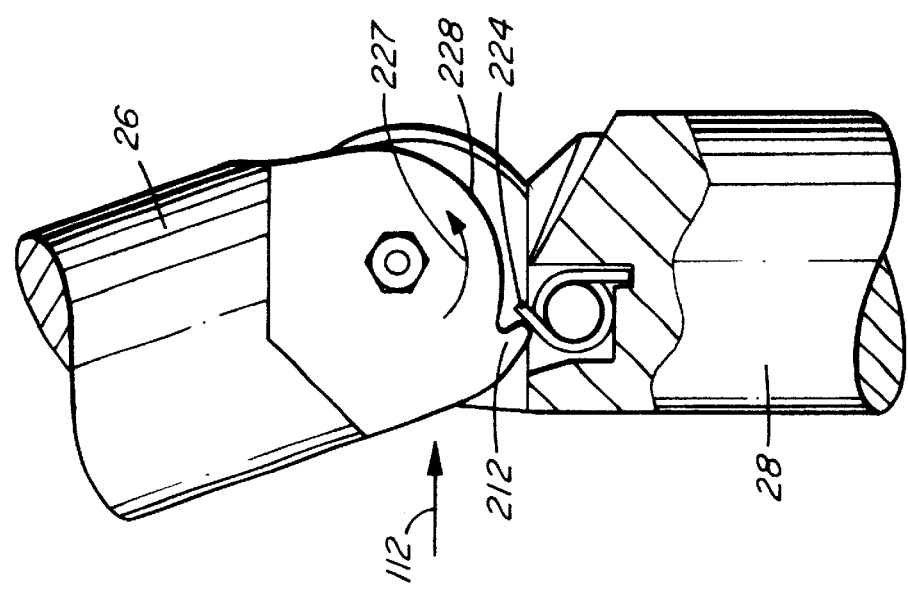
FIG. 10B is a sectional side view of the joint of FIG. 10A showing the first and second members between the second and the third or hyperextended positions.
Figure 10A:
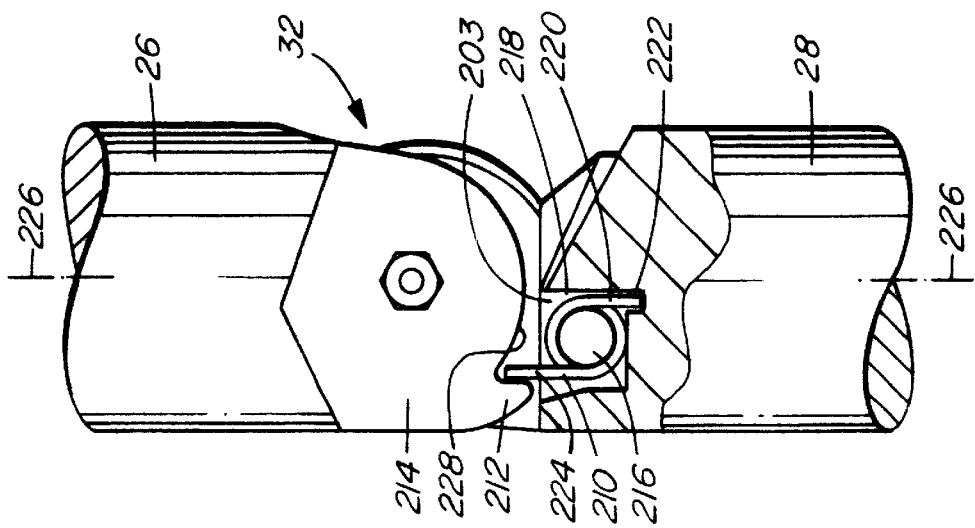
FIG. 10A is a sectional side view of a joint according to a fourth embodiment of the invention showing the joint with the first and second members thereof in the second position.

Spring 210 includes upper extension 224 which extends upwardly parallel with the longitudinal axis 226 of portions 26 and 28 when in the second position as depicted in FIG. 10A. Lower extension portion 220 also extends parallel with the longitudinal axis 226.

Upon application of the predetermined force in the direction of arrow 112, portions 26 and 28 may be moved with respect to one another from the second position to an intermediate position between the second and third positions, as depicted in FIG. 10B, and in the direction of arrow 227. Hook 212 is thereby forced against extension 224 bending extension 224 downwardly and in the direction of arrow 112. Further movement of portions 26 and 28 due to force applied in the direction of arrow 112 will move portions 26 and 28 to the third or hyperextended position depicted in FIG. 10C. Extension 224 is moved past hook 212 to again extend generally in an upward direction. Similar to the first embodiment, when in the third position, stop 116 contacts semicircular part 114 to prevent movement from the third position in a direction away from the second position.

Joint 32 may be rotated back to move portions 26 and 28 from the third position to the second position by applying force in a direction opposite to that of arrow 112. Hook 212 is forced past extension 224 due to the resiliency of spring 210. Once portions 26 and 28 have been moved back to the second position as depicted in FIG. 10A, extension 224 moves back into position against hook 212 to again prevent movement from the second to the third position until application of at least the predetermined force on portions 26 and 28 in the direction of arrow 112.

It can also be seen that flange 214 includes lower semicircular portion 228 of radius sufficiently small to avoid contacting extension 224 to permit movement of portions 26 and 28 from the second position to the first position without contacting extension 224.

Thus several exemplary embodiments for a hyperextending joint is provided. One skilled in the art will appreciate that the present invention can be practised by other than the described embodiments, which are presented for purposes of illustration and not limitation, and the present invention is limited only by the claims that follow.

What is claimed is:

1. A joint for rotatably connecting a distal part to a proximal part of a testing and training target, the joint comprising:
   (a) a first member attachable to one of a distal part and a proximal part of a target;
   (b) a second member attachable to the other of the distal part and the proximal part of the target;
   (c) the first and second members being rotatable relative to each other and engageable with each other such that the first member may be rotated with respect to the second member between a first position and a second position and upon the application of a first pre-determined force rotated past the second position to a third position;
   (d) the first predetermined force being greater than the force required to rotate the first member with respect to the second member between the first and second positions; and
   (d) a detent communicating with one or both of the first and second members preventing movement of the members past the second positions to the third position unless at least the first predetermined force is applied to one or both of the members, the detent not interfering with rotation of the first member with respect to the second member between the first and second positions.

2. The joint of claim 1, further comprising a third position stop preventing movement of the members past the third position in a direction of movement away from the second position.

3. The joint of claim 1, wherein the detent prevents movement of the first and second members from the third position to the second position until at least a second pre-determined force is applied to one or both of the members.

4. The joint of claim 1, wherein the first pre-determined force approximates the force required to move a human forearm with respect to the connected upper arm from a normal position to a hyperextended position.

5. The joint of claim 1, wherein the first predetermined force is between 147.06 N and 1,960.78 N.

6. The joint of claim 1, wherein the first predetermined force is about 441.18 N.

7. The joint of claim 2, wherein the stop comprises a first contact surface on one of the first or second members which contacts a second contact surface on the other of the first or second members to prevent rotation of the members past the third position.

8. The joint of claim 1, wherein the third position corresponds to a hyperextended position of the forearm with respect to the upper arm of a typical person.

9. The joint of claim 2, further comprising a first position stop preventing movement of the members past the first position in a direction of movement away from the second position.

10. The joint of claim 1, wherein the first member is shaped to resemble a human upper arm, the second member is shaped to resemble a human forearm and the joint is positioned to emulate the function of the elbow joint.

11. The joint of claim 3, wherein the first pre-determined force is larger than the second pre-determined force.

12. The joint of claim 3, wherein the first pre-determined force is less than the second pre-determined force.

13. The joint of claim 3, wherein the first pre-determined force is approximately equal to the second pre-determined force.

14. The joint of claim 1, wherein the first member is shaped to resemble a human upper leg, the second member is shaped to resemble a human lower leg, and the joint is positioned to emulate the function of the knee joint.

15. The joint of claim 2, wherein the members may be moved past the third position in a direction of movement away from the second position upon application of a third pre-determined force applied to one or both of the members.

16. The joint of claim 15, wherein the third pre-determined force is greater than the first pre-determined force.

17. The joint of claim 16, wherein the third pre-determined force approximates the force required to move the upper arm with respect to the forearm past a hyperextended position to a position where serious damage could occur to the elbow joint.

18. The joint of claim 1, wherein the first member comprises a flange extending axially from an end of one of the distal part and the proximate part of the target and the second member comprises a pair of spaced opposed securing members defining a flange receptacle therebetween for receiving and rotatably engaging the flange within the flange receptacle, the flange and flange receptacle connected for rotation with respect to one another about a pivot axis.

19. The joint of claim 18, wherein the flange comprises an opening extending laterally therethrough and where the securing members comprise a corresponding opening through each securing member aligned with the hole in the flange when the flange is in the flange receptacle and further comprising a pivot pin extending through the opening in the flange and the openings in the securing members for pivotally connecting the flange to the flange receptacle for pivotal movement of the distal part with respect to the proximal part of the target about the pivot axis.

20. The joint of claim 18, wherein the detent is located on the flange.

21. The joint of claim 18, wherein the detent comprises a resiliently deformable extension on the flange positioned to engage the flange receptacle when the first and second members are in the second position, and one or both of the detent and flange receptacles being deformable to permit movement of the first and second members from the second position to the third position upon application of at least the first predetermined force on one or both of the members.

22. The joint of claim 20, wherein the detent is resiliently deformable and the flange receptacle includes a face for contacting the detent when the members are in the second position and for preventing movement of the detent past the second position to the third position unless the first predetermined force is applied on the members.

23. The joint of claim 22, wherein the detent is positioned with respect to the face to prevent movement of the first and second members from the third position to the second position until at least a second pre-determined force is applied to one or both of the members.

24. The joint of claim 22, wherein the detent is generally triangular in cross-section with a first segment contacting the face when the members are in the second position.

25. The joint of claim 22, wherein the detent is generally triangular in cross-section with a first segment contacting the face when the members approach the second position from the first position and a second segment contacting the face when the members approach the second position from the third position.

26. The joint of claim 1, wherein the detent comprises an engagement member connected to one of the first and second members for reciprocal movement, the engagement member comprising a spring means urging the engagement member in its extended position and permitting retraction of the engagement member to a retracted position permitting movement of the other of the first and second members past the engagement member upon application of the first pre-determined force.

27. The joint of claim 20 wherein the flange receptacle has a detent contact surface positioned in the flange receptacle with respect to the detent to permit movement of the members with respect to one another about their pivot axis between the first position and the second position, and the second position and the third position, and positioned to contact the detent when the members are in the second position to prevent movement past the second position until application of at least the first predetermined force on one or both of the members.

28. The joint of claim 1 wherein the second position orients the members generally in linear alignment.

29. The joint of claim 24, wherein the members are generally in linear alignment when the first segment of the detent contacts the shoulder when the members are in the second position.

30. The joint of claim 25, wherein the members are generally in linear alignment when the first segment of the detent contacts the shoulder when the members are in the second position.

31. The joint of claim 18, wherein the flange has an opening extending through the flange and wherein the securing members each have corresponding opposed and co-axial openings through each securing member for alignment with the opening in the flange and further comprising a pivot pin extending through the openings in the flange and securing members to permit rotation of the first and second members between the first position and the second position, and upon the application of the first predetermined force, rotated past the second position to a third position.

32. The joint of claim 31, wherein the first and second members are rotatable relative to each other in a reverse direction from the third position, and upon application of a second predetermined force past the second position and further rotated to the first position.

33. The joint of claim 1, wherein the detent comprises an interference member connected to one of the first and second members by a spring which biases the interference member away from the member to which it is attached and wherein the other of the first and second members comprises a receptacle for receiving the interference member, positioned to retain the interference member in the receptacle when the members are in the second position and wherein the spring is deformable to permit retraction of the interference member toward the member to which it is attached sufficiently to permit movement of the interference member from the recess upon application of at least the first predetermined force on the members.

34. The joint of claim 33, wherein the interference member comprises a ball held by the spring.

35. The joint of claim 33, wherein the interference member comprises a spring actuated toggle switch permitting movement of the interference member laterally in relation to the member to which it is attached to release the interference member from the receptacle upon application of the predetermined force on the members.

36. The joint of claim 33, wherein the interference member comprises a segment of the spring extending outwardly from the spring and contacting the receptacle to prevent movement of the members past the second position until at least the first predetermined force is applied to the members.

37. The joint of claim 1, wherein the first predetermined force is between 343.14 N and 539.32 N.

38. The joint of claim 1, wherein the first predetermined force is between 245.1 N and 445.18 N.

39. The joint of claim 1, wherein the first predetermined force is about 343.14 N.

40. The joint of claim 1, wherein the first predetermined force is between 196.08 N and 392.16 N.

41. The joint of claim 1, wherein the first predetermined force is about 313.73 N.

42. A joint for rotatably connecting a distal part to a proximal part of a testing and training target, the joint comprising:
(a) a first member attachable to one of a distal part and a proximal part of a target;
(b) a second member attachable to the other of the distal part and the proximal part of the target;
(c) the first and second members being rotatable relative to each other and engageable with each other such that the first member may be rotated with respect to the second member between a first position and a second position and upon the application of a first predetermined force rotated past the second position to a third position;
(d) the first predetermined force being greater than the force required to rotate the first member with respect to the second member between the first and second positions; and
(e) a detent communicating with one or both of the first and second members preventing movement of the first and second members past the second position to the third position unless at least the first predetermined force is applied to one or both of the first and second members, the detent not interfering with rotation of the first member with respect to the second member between the first and second positions;

wherein the first member comprises a flange extending axially from an end of one of the distal part and the proximate part of the target and the second member comprises a pair of spaced opposed securing members defining a flange receptacle therebetween for receiving and rotatably engaging the flange within the flange receptacle, the flange and flange receptacle connected for rotation with respect to one another about a pivot axis, and wherein the detent is located on the flange.

43. The joint of claim 42, wherein the detent comprises a resiliently deformable extension on the flange positioned to engage the flange receptacle when the first and second members are in the second position, and one or both of the detent and flange receptacles being deformable to permit movement of the first and second members from the second position to the third position upon application of at least the first predetermined force on one or both of the first and second members.

44. The joint of claim 42, wherein the detent is resiliently deformable and the flange receptacle includes a face for contacting the detent when the first and second members are in the second position and for preventing movement of the detent past the second position to the third position unless the first predetermined force is applied on the first and second members.

45. The joint of claim 44, wherein the detent is positioned with respect to the face to prevent movement of the first and second members from the third position to the second position until at least a second pre-determined force is applied to one or both of the first and second members.

46. The joint of claim 44, wherein the detent is generally triangular in cross-section with a first segment contacting the face when the first and second members are in the second position.

47. The joint of claim 44, wherein the detent is generally triangular in cross-section with a first segment contacting the face when the first and second members approach the second position from the first position and a second segment contacting the face when the first and second members approach the second position from the third position.

48. The joint of claim 42 wherein the flange receptacle has a detent contact surface positioned in the flange receptacle with respect to the detent to permit movement of the first and second members with respect to one another about their pivot axis between the first position and the second position, and the second position and the third position, and positioned to contact the detent when the first and second members are in the second position to prevent movement past the second position until application of at least the first predetermined force on one or both of the first and second members.

49. The joint of claim 46, wherein the first and second members are generally in linear alignment when the first segment of the detent contacts the shoulder when the first and second members are in the second position.

50. The joint of claim 47, wherein the first and second members are generally in linear alignment when the first segment of the detent contacts the shoulder when the first and second members are in the second position.

51. The joint of claim 42, wherein the flange has an opening extending through the flange and wherein the securing members each have corresponding opposed and co-axial openings through each securing member for alignment with the opening in the flange and further comprising a pivot pin extending through the openings in the flange and securing members to permit rotation of the first and second members between the first position and the second position, and upon the application of the first predetermined force, rotated past the second position to a third position;

and wherein the first and second members are rotatable relative to each other in a reverse direction from the third position, and upon application of a second predetermined force past the second position and further rotated to the first position;

and wherein the detent comprises an interference member connected to one of the first and second members by a spring which biases the interference member away from the said one of the first and second members to which it is connected;

and wherein the interference member comprises a ball held by the spring.

52. The joint of claim 42 wherein the flange has an opening extending through the flange and wherein the securing members each have corresponding opposed and co-axial openings through each securing member for alignment with the opening in the flange and further comprising a pivot pin extending through the openings in the flange and securing members to permit rotation of the first and second members between the first position and the second position, and upon the application of the first predetermined force, rotated past the second position to a third position;

and wherein the first and second members are rotatable relative to each other in a reverse direction from the third position, and upon application of a second predetermined force past the second position and further rotated to the first position;

and wherein the detent comprises an interference member connected to one of the first and second members by a spring which biases the interference member away from the said one of the first and second members to which it is connected and wherein the other of the first and second members comprises a receptacle for receiving the interference member, positioned to retain the interference member in the receptacle when the first and second members are in the second position and wherein the spring is deformable to permit retraction of the interference member toward the said one of the first and second members to which it is connected sufficiently to permit movement of the interference member from the recess upon application of at least the first predetermined force on the first and second members;

and wherein the interference member comprises a spring actuated toggle switch permitting movement of the interference member laterally in relation to the said one of the first and second members to which it is connected to release the interference member from the receptacle upon application of the predetermined force on the first and second members.

53. The joint of claim 42, wherein the flange has an opening extending through the flange and wherein the securing members each have corresponding opposed and co-axial openings through each securing member for alignment with the opening in the flange and further comprising a pivot pin extending through the openings in the flange and securing members to permit rotation of the first and second members between the first position and the second position, and upon the application of the first predetermined force, rotated past the second position to a third position;

and wherein the first and second members are rotatable relative to each other in a reverse direction from the third position, and upon application of a second predetermined force past the second position and further rotated to the first position;

and wherein the detent comprises an interference member connected to one of the first and second members by a spring which biases the interference member away from the said one of the first and second members to which it is connected and wherein the other of the first and second members comprises a receptacle for receiving the interference member, positioned to retain the interference member in the receptacle when the first and second members are in the second position and wherein the spring is deformable to permit retraction of the interference member toward the said one of the first and second members to which it is connected sufficiently to permit movement of the interference member from the recess upon application of at least the first predetermined force on the first and second members;

and wherein the interference member comprises a segment of the spring extending outwardly from the spring and contacting the receptacle to prevent movement of the first and second members past the second position until at least the first predetermined force is applied to the first and second members.

* * * * *